United States Patent [19]

Lutz et al.

[11] 4,138,886
[45] Feb. 13, 1979

[54] METHOD AND APPARATUS TO MEASURE THE RATE OF ADVANCE OF A DRILLING TOOL ON A FLOATING DRILLING INSTALLATION

[75] Inventors: Jean Lutz, Pau; François Besnard, Lescar, both of France

[73] Assignee: Societe Nationale Elf Aquitaine (Production), Paris, France

[21] Appl. No.: 819,041

[22] Filed: Jul. 26, 1977

[30] Foreign Application Priority Data

Jul. 30, 1976 [FR] France .................. 76 23397

[51] Int. Cl.$^2$ .......................................... E21B 47/00
[52] U.S. Cl. ...................................... 73/151; 175/5
[58] Field of Search .............. 73/151, 151.5; 175/5; 173/11; 33/125 B

[56] References Cited

U.S. PATENT DOCUMENTS

| | | | |
|---|---|---|---|
| 3,001,396 | 9/1961 | Cleveland | 175/5 |
| 3,931,735 | 1/1976 | Guigmard | 73/151.5 |
| 3,965,728 | 6/1976 | van den Berg | 73/84 |

Primary Examiner—Anthony V. Ciarlante
Attorney, Agent, or Firm—Brisebois & Kruger; Burns, Doane, Swecker & Mathis

[57] ABSTRACT

The disclosure relates to measurement of the rate of advance of a drill bit from a floating drilling installation. The process includes joining a point of the drilling system, fixed in translation with the movement of the drill string, at the lower extremity of which is a drill bit, to a fixed point solid with the ground, by a cable of constant length passing through a pulley system fixed to the floating drilling installation, to measure the angular displacements of different pulleys of the pulley system and to derive from them magnitudes representing the rate of advance of the drill bit. This procedure, applied to a floating drilling system, eliminates the effect of vertical movements, that is swells or waves, from the measurements.

8 Claims, 4 Drawing Figures

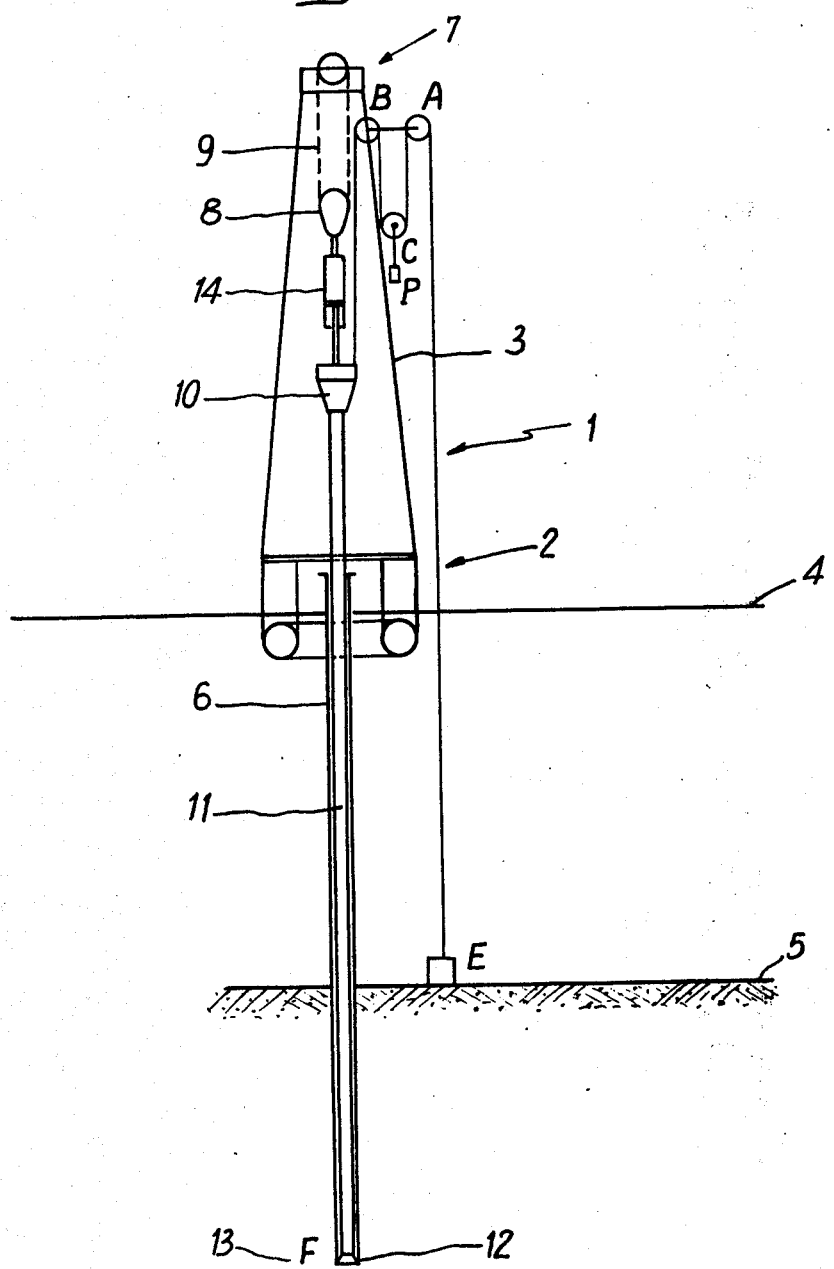

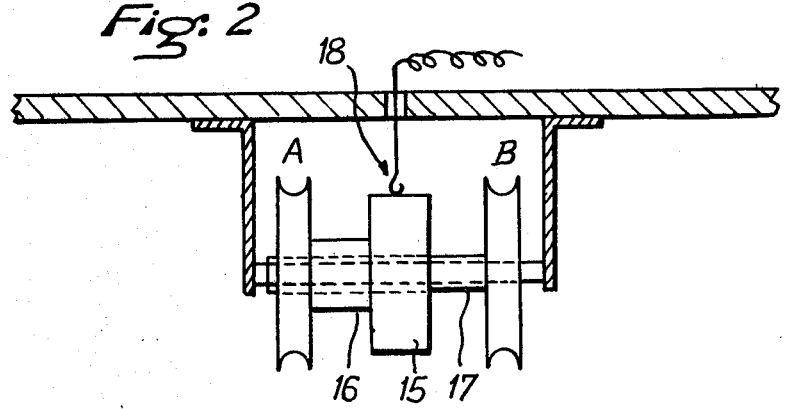
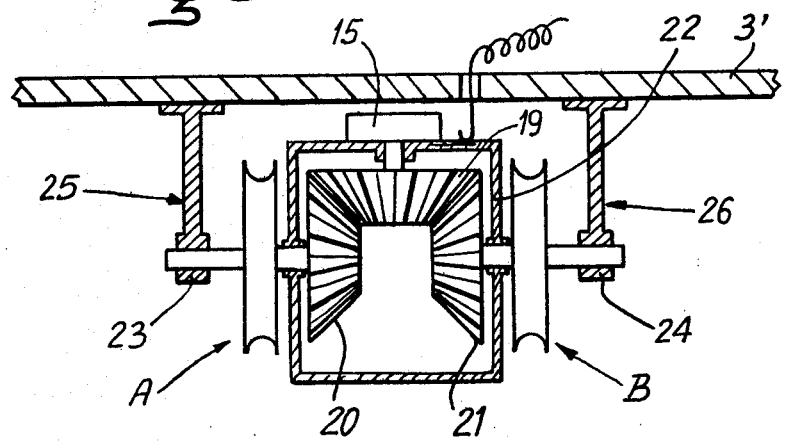
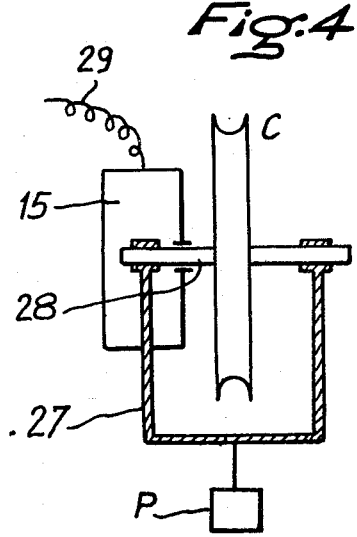

METHOD AND APPARATUS TO MEASURE THE RATE OF ADVANCE OF A DRILLING TOOL ON A FLOATING DRILLING INSTALLATION

SUMMARY OF THE INVENTION

The invention concerns a process for measuring the advance of the drill bit from a floating drilling installation.

When a drilling installation is fixed to the ground, the advance of the bit is determined by measuring the advance or displacement of the drill string either in relation to the drilling platform or in relation to the ground. The displacement of the drill string is taken as the linear movement of the injection head or as the circular movement of upper pulleys of a pulley system of the drilling rig.

In a floating drilling installation, because of variations in water level due to waves, swells, tides, the drilling platform moves vertically in relation to the ground, that is, in relation to the bottom of the sea.

Various means are used to permit drilling in spite of the vertical movements of the drilling platform. Known, for example, are wave compensators which movably join the lower pulley with the injection head and the slide which movably joins the injection head with the drill string.

The measure of the advance of the drill bit presupposes knowledge or understanding of the displacements of the injection head in relation to the drilling rig, of the drilling rig in relation to the bottom of the sea surface, and of the injection head in relation to the drill bit. A movement sensor can provide the first measurement, while the two others can only be obtained from the solution of complex problems or equations.

The present invention solves this difficulty by eliminating the effects of variations in sea level and the influence of the wave compensator.

In the process according to the invention, to measure the rate of advance of the drill bit on a floating drilling installation, a point of the drill system fixed to and movable with the drill string and at the lower extremity of which is a drill bit, is joined to a point fixed to the ground (sea bottom), by a cable of constant length passing over a pulley system united to the floating drilling installation, to permit measure of the angular displacements of different pulleys of the pulley system and to derive from them quantities representing the rate of advance of the drill bit. This end is achieved by measuring the difference in angular displacements of two upper extreme pulleys of the pulley system, this difference being proportional to the displacement or advance of the drill bit. This result can also be obtained by measuring the angular displacement of one of the lower pulleys of the pulley system, this angular displacement also being proportional to the displacement of the drill bit.

The apparatus according to the invention for measuring the rate of advance of the drill bit, from a floating drilling installation, comprises a cable linkage between a point of the drill system, united in movement with the drill string, and a fixed point united to the ground, made up of a cable of constant length, a pulley system having at least two upper pulleys whose axes are supported by a support fixed to the floating drilling installation, and at least one lower pulley whose axis is ballasted by a counterweight, and with means to measure the different between the angular displacements of the upper extreme pulleys.

In one embodiment, the means to measure the difference between the angular displacements of the upper pulleys is a sensor of angular displacement comprising an arbor or shaft turning inside a sensor body, (the shaft being aligned with the axis of one of the upper extreme pulleys), the sensor body remaining fixed with respect to the other upper extreme pulley.

In a preferred embodiment, the means to measure the difference between the angular displacements of the upper pulleys is a differential gear having two equal gear, called satellites, whose axes situated in the same plane are each aligned with the axis of one of the upper extreme pulleys of the pulley system, the satellite gears engaging a planetary gear whose axis is in the plane of the axes of the satellite gears and bisects the axes, and on which (planetary gear) is positioned a sensor of angular displacement.

Another apparatus, according to the invention, to measure the rate of advance of the drill bit, on a floating drilling installation, comprises a linkage between a point of the drilling system, united in movement with the drill string, at the lower extremity of which is a drill bit, and a fixed point united to the ground by a cable of constant length, a pulley system comprising at least two upper pulleys whose axes are supported by a support rigidly joined to the floating drilling installation, and at least one lower pulley whose axis is ballasted by a counterweight, and including means to measure the angular displacements of a lower pulley.

In another embodiment the means to measure the angular displacements of one of the lower pulleys is a sensor of angular displacements whose body is fixed to the counterweight of the lower pulley and whose shaft is joined for rotation with the axis of the lower pulley.

The process according to the invention as well as the apparatus given purely for the sake of example, are disclosed in the drawings.

BRIEF DESCRIPTION OF THE DRAWINGS

FIG. 1 is a schematic representation of a floating drilling installation including the apparatus of this invention;

FIG. 2 is a schematic view partly in section of a first embodiment of the upper pulley sensor arrangement according to the invention;

FIG. 3 is a view corresponding to FIG. 2 and showing a variation of the sensor arrangement; and FIG. 4 is a schematic arrangement for the lower pulley.

FIG. 1 is a schematic representation of a floating drilling installation 1, comprising a floating drilling platform 2, on which is mounted a drilling derrick 3. The drilling platform 2 remains above the sea level 4. The level of the sea 4 is at a distance from the bottom 5 of the sea, which distance varies with the swells and with the tides.

The drilling derrick 3, supports a drilling system 6 by means of a pulley system comprising an upper pulley system 7, fixed at the top of the derrick and a lower mobile pulley system 8, joined by the control cable 9 to the upper pulley system.

The drilling system 6, comprises an injection head 10 at the upper end of a drill string 11, provided at its lower extremity F with a drill bit 12 in contact with the bottom of the borehole 13. Between the lower mobile pulley system 8 and the injection head 10, is a swell or wave compensator 14.

The process according to the invention by means of a pulley measuring system comprising two equal upper pulleys A and B, whose axes are fixed to the drill derrick, and a lower movable pulley C, on the axis of which is a weight P, consists in joining a point of the drill system, for example a point of the injection head 10, fixed in translation with the drill string and at the lower extremity of which is a drill bit 12 with extremity F, to a point E, fixed at the bottom of the sea 5.

Let us study the behavior of this device in different cases:

1. When the advance of the drill bit is zero, the device reacts only to the wave motion.

When the advance of the bit is zero, the system becomes at two fixed points E and F joined to pulleys A and B by distances AE and BF of constant difference.

A wave swell which raises the platform causes a lengthening of distances AE and BF and thus a shortening of lengths AC and BC, and a lowering of the sea level has the opposite effect.

Swell motion causes then a variation by the same amount of lengths AC and BC, without rotating pulley C, but causing pulleys A and B to rotate equally but in opposite directions.

2. When the bit advances, with no swells, pulleys A and B remain fixed in space, distance AE remains constant, while distance BF varies in length.

A variation h of length BF, causes distance BC to vary by ½ h, and AC also changes ½ h.

A displacement of the drill bit, without swell or tidal movement, causes a variation of the same amount of distance BF and a variation of ½ this displacement in the distances AC and BC. There results from this:

- a rotation of pulley B as a function of the variation of BF,
- a rotation of pulley C corresponding to ½ of the variation BF,
- pulley A remains stationary,
- the directions of rotation of the pulleys (B and C) depend on the direction of the pulley systems, and the direction of displacement of the drill bit.

3. When the device reacts to both displacement of the bit and action of swells, notice that point E is fixed, and F is joined to the displacement of the bit.

Pulleys A and B, whose axes are fixed to the derrick, are affected by movements of translation from swells.

Distance AE has one fixed extremity E, and the other (A) movable and the length AE is variable. Pulley C undergoes two combined displacements:

(a) Swell motion by translation of the pulley, and
(b) Bit movement by translation and rotation of the pulley.

Pulley A only turns for swell motion.

Pulley B turns for movements of the swells and of the bit.

The process for measuring the rate of advance of the drill bit on a floating drilling installation comprises measuring the angular displacements of different pulleys which will be described and in deriving from them distances representing the rate of advance of the drill bit. It follows from the preceding study that a distance representing the rate of advance is given by the difference in angular displacement of two upper pulleys A and B, and that another such distance is given by the angular displacement of the lower pulley C.

FIG. 2 shows an embodiment using a sensor 15 of angular displacement, coaxial and united by means of a cylindrical body 16, to an extreme pulley A of the pulley measuring system and rotating on a rotating arbor 17 in the form of a hollow rotatable shaft fixed to and coaxial with the other extreme pulley B of the pulley measuring system. This solution demands the use of a collector 18. The signal received by the collector, proportional to the difference between the angular displacements of A and of B, is, from this fact, proportional to the displacement of the drill bit.

FIG. 3 shows an embodiment using a sensor of angular displacements 15, with a planetary gear 19, driven by two satellite gears 20 and 21, equal and symmetrical. Each of the satellite gears is aligned with the axis of one of the upper extreme pulleys A and B of the pulley measuring system.

The displacement sensor 15, is fixed on a part 22, solid with a bearing of each gear 19, 20, 21. The outer bearing 23 of pulley A and of gear 20, and the outer bearing 24 of pulley B and of gear 21, are fixed by supports 25 and 26 to part 3', united to the drill derrick. Part 22 is a cylindrical planetary carrier which can revolve about the axis of gears 20, 21.

The signal received by the sensor, is, here also, proportional to the displacement of the drill bit.

FIG. 4 shows an embodiment comprising a sensor of angular displacements 15 positioned on lower pulley C of the pulley measuring system. The sensor of angular displacements 15, is fixed to a U-shaped support 27 having bearings mounting the support on shaft 28 of pulley C, the shaft being keyed to pulley C and the sensor rotation of the pulley shaft.

The angular displacements of pulley C are directly sensed, thus producing a measure of the advance of the drill bit.

In this embodiment, electric cable 29 should be sufficiently long to permit a displacement of pulley C equal to one half of the height of the drill derrick.

Each of the described embodiments produces an instantaneous measure of the rate of advance of a drill bit from a floating drilling installation, whether or not the installation is equipped with a swell compensator.

What is claimed is:

1. Process to measure the rate of advance of a drill bit from a floating drilling system, fixed in translation with the movement of the drill stem and at the lower extremity of which is a drill bit is fixed to the ground by a cable of constant length extending over and moving on a pulley system including at least two pulleys solid with the floating drilling installation, and in which the angular displacements of different pulleys of the pulley system are measured, and from which quantities representing the rate of advance of the drill tool are derived.

2. Process according to claim 1 in which the difference in angular displacement of two upper extreme pulleys of the pulley system are measured, this difference being proportional to the displacement of the drill bit.

3. Process according to claim 1, in which the angular displacement of a lower pulley of the pulley system is measured, this angular displacement being proportional to the displacement of the drill bit.

4. Apparatus for measuring the rate of advance of a drill bit from a floating drilling installation, comprising a linkage between a point of the drilling system, at the lower extremity of which is a drill bit, and a fixed point on the ground, the linkage being a cable of constant length, a pulley system comprising at least two upper pulleys whose axes are on a rigid suppport joined to the floating drilling installation, and at least one lower pulley whose axis is moveable by the cable and is ballasted by a counterweight, said cable extending around and rotating said upper pulleys and said lower pulley, and means to measure the difference between the angular displacements of the extreme upper pulleys.

5. Apparatus according to claim 4, in which the means to measure the difference between the angular displacements of the upper pulleys is a sensor of angular displacements comprising an arbor turning inside the sensor body, so that the arbor is aligned with the axis of one of the extreme upper pulleys, the body being fixed to the other upper extreme pulley.

6. Device according to claim 4, in which the means to measure the difference between the angular displacements of the upper pulleys is a differential gear comprising two equal satellite gears with axes placed in the same plane and each aligned with the axis of one of the extreme upper pulleys of the pulley system, the said satellite gears engaging planetary gear whose axis is situated in the plane of the axes of the satellite wheels and bisects said axes and on which is positioned a sensor of angular displacements.

7. Apparatus for measuring the rate of advance of a drill bit, on a floating drilling installation, comprising a linkage between one point of the drilling system fixed in translation with the movement of the drill stem, at the lower extremity of which is a drill bit, and a fixed point connected with the ground by a cable of constant length, a pulley system comprising at least two upper pulleys whose axes are supported by a support fixed to the floating drilling installation and at least one lower pulley whose axis is moveable by the cable and is ballasted by a counterweight, said cable extending around and rotating said upper pulleys and said lower pulley, and means to measure the angular displacements of said one lower pulley.

8. Apparatus according to claim 7, in which the means to measure the angular displacements of said one lower pulley is a sensor of angular displacements whose body is fixed to the counterweight of the lower pulley, and having and arbor fixed in rotation with the shaft of the said lower pulley.

* * * * *